US010011912B2

(12) United States Patent
Watanabe

(10) Patent No.: US 10,011,912 B2
(45) Date of Patent: Jul. 3, 2018

(54) HYDROGEN REFINING PRESSURE-BOOSTING DEVICE

(71) Applicant: UNIVERSITY OF YAMANASHI, Yamanashi (JP)

(72) Inventor: Masahiro Watanabe, Yamanashi (JP)

(73) Assignee: UNIVERSITY OF YAMANASHI, Yamanashi (JP)

( * ) Notice: Subject to any disclaimer, the term of this patent is extended or adjusted under 35 U.S.C. 154(b) by 51 days.

(21) Appl. No.: 14/909,871

(22) PCT Filed: Aug. 5, 2014

(86) PCT No.: PCT/JP2014/070649
§ 371 (c)(1),
(2) Date: Feb. 3, 2016

(87) PCT Pub. No.: WO2015/020065
PCT Pub. Date: Feb. 12, 2015

(65) Prior Publication Data
US 2016/0168730 A1    Jun. 16, 2016

(30) Foreign Application Priority Data

Aug. 5, 2013   (JP) ................................ 2013-162148

(51) Int. Cl.
*C25B 1/04*     (2006.01)
*C25B 9/08*     (2006.01)
(Continued)

(52) U.S. Cl.
CPC ................ *C25B 9/18* (2013.01); *B01D 53/22* (2013.01); *B01D 63/082* (2013.01); *C25B 1/02* (2013.01);
(Continued)

(58) Field of Classification Search
CPC .... C25B 1/04; C25B 9/08; C25B 1/00; C25B 1/02; C25B 9/00; C25B 9/18; C25B 1/10; C25B 1/12; B01D 2256/16
(Continued)

(56) References Cited

U.S. PATENT DOCUMENTS

2004/0211679 A1    10/2004  Wong et al.
2006/0024558 A1     2/2006  Friedman et al.
(Continued)

FOREIGN PATENT DOCUMENTS

CN         101420042 A      4/2009
JP          5-021079 A      1/1993
(Continued)

OTHER PUBLICATIONS

International Search Report dated Sep. 30, 2014 from corresponding International Patent Application No. PCT/JP2014/070649; 2 pgs.
(Continued)

*Primary Examiner* — Zulmariam Mendez
(74) *Attorney, Agent, or Firm* — Maier & Maier, PLLC

(57) ABSTRACT

Provided is a hydrogen refining pressure-boosting device which is durable even in a high-pressure environment. This hydrogen refining pressure-boosting device produces, from a hydrogen-containing gas, a refined hydrogen gas having higher pressure and higher purity than the hydrogen-containing gas. The hydrogen refining pressure-boosting device is equipped with multiple stacked cell structures, and a pressing structure that applies tightening stress in the direction in which the cell structures are stacked. In this hydrogen refining pressure-boosting device the flow path surface of a cathode-side separator is sized so as to be contained on the inside of the flow path surface of an anode-side separator, in the direction of a plane parallel to a solid polymer electrolyte membrane.

9 Claims, 10 Drawing Sheets

(51) Int. Cl.
  *C25B 1/00* (2006.01)
  *C25B 9/00* (2006.01)
  *C25B 9/18* (2006.01)
  *C25B 1/10* (2006.01)
  *B01D 53/22* (2006.01)
  *H01M 8/0662* (2016.01)
  *H01M 8/04082* (2016.01)
  *B01D 63/08* (2006.01)
  *C25B 1/02* (2006.01)
  *C25B 13/04* (2006.01)
  *H01M 8/0612* (2016.01)

(52) U.S. Cl.
  CPC ......... *C25B 13/04* (2013.01); *H01M 8/04201* (2013.01); *H01M 8/0681* (2013.01); *B01D 2256/16* (2013.01); *H01M 8/0618* (2013.01)

(58) Field of Classification Search
  USPC .................................................. 204/242, 253
  See application file for complete search history.

(56) References Cited

U.S. PATENT DOCUMENTS

| | | | |
|---|---|---|---|
| 2006/0065520 A1 | 3/2006 | Ballantine et al. | |
| 2006/0254907 A1* | 11/2006 | Taruya | C25B 1/12 204/266 |
| 2008/0090140 A1* | 4/2008 | Dalton | H01M 8/248 429/160 |
| 2008/0182148 A1* | 7/2008 | Skala | H01M 8/04089 429/414 |
| 2010/0129732 A1 | 5/2010 | McElroy et al. | |
| 2013/0015059 A1 | 1/2013 | Haryu et al. | |
| 2013/0130141 A1* | 5/2013 | Matsuda | H01M 8/04201 429/429 |
| 2014/0151217 A1* | 6/2014 | Nakazawa | C25B 9/08 204/266 |

FOREIGN PATENT DOCUMENTS

| | | |
|---|---|---|
| JP | 9-169501 A | 6/1997 |
| JP | 2004-018982 A | 1/2004 |
| JP | 2007-023343 A | 2/2007 |
| JP | 2008-121086 A | 5/2008 |

OTHER PUBLICATIONS

Extended European Search Report dated Dec. 16, 2016, including the Supplementary European Search Report and the European Search Opinion, in connection with corresponding EP Application No. 14833776.9 (8 pgs.).

Chinese Office Action dated Dec. 27, 2016, in connection with corresponding CN Application No. 201480044194.3 (13 pgs., including English translation).

European Office Action, dated Dec. 1, 2017, in connection with corresponding EP Application No. 14833776.9 (4 pgs.).

* cited by examiner

FIG. 5
(a) FIRST EMBODIMENT
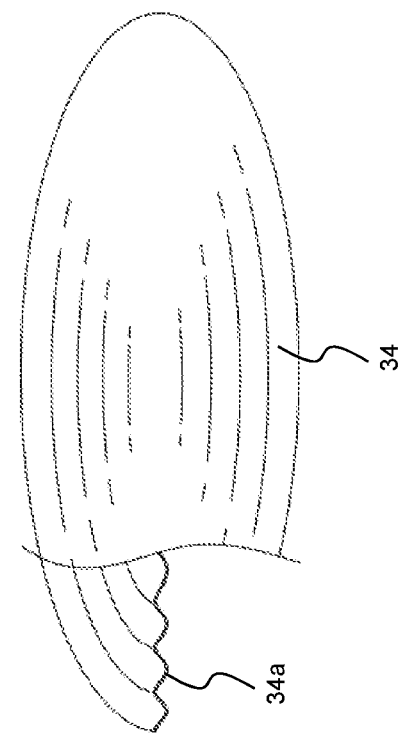
(b) THIRD EMBODIMENT
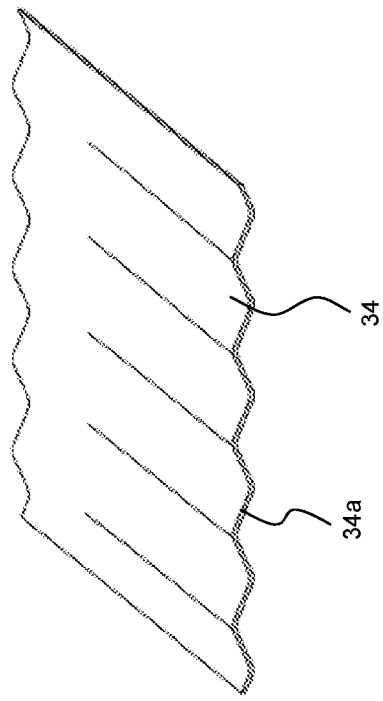

HYDROGEN REFINING PRESSURE-BOOSTING DEVICE

TECHNICAL FIELD

The present invention relates to a hydrogen purification/compression apparatus for producing high-concentration, high-pressure purified hydrogen gas from low-pressure hydrogen-containing gas.

BACKGROUND ART

Polymer electrolyte fuel cells (hereafter referred to as "PEFCs") using hydrogen as fuel are being developed. In particular, a wide variety of PEFCs for automobiles and household power generation are being developed. Fuel cell systems for household power generation have been already commercialized. It is expected that fuel cell vehicles including fuel cells will also be commercialized in the near future. Unlike fuel cell systems for household power generation, the widespread use of fuel cell vehicles requires constructing a fuel supply infrastructure. That is, with the spread of the use of fuel cell vehicles, a hydrogen station has to be constructed in each region.

A hydrogen station stores high-purity, high-pressure hydrogen and supplies it to fuel cell vehicles. Methods for supplying fuel to a hydrogen station include a method of transporting hydrogen produced in a different place using a tank truck and a method of producing hydrogen at the hydrogen station. However, hydrogen has a low energy density and therefore is not suitable for transportation using a tank truck, unlike gasoline. For this reason, it is preferred to produce hydrogen, and purify and compress it at the hydrogen station. Also, it is predicted that small, low-cost hydrogen stations will be needed at the beginning of the widespread use of fuel cell vehicles.

As a hydrogen production process, there has been known a process that reforms town gas containing methane as a main component into hydrogen-containing reformed gas, purifies the reformed gas using a pressure swing adsorption (PSA) system, and compresses the resulting hydrogen using a compressor. However, a PSA system is large and costly. Further, the proportion of the reformed gas which can be recovered as high-purity hydrogen is typically 80% or less, and the remainder is used as the heat source of the reforming reaction. Furthermore, while compressing hydrogen to 700 to 1000 atmospheres, which are required by a hydrogen station, requires using a two-stage compressor system, such a compressor system has a low compression efficiency of 60 to 70%, wastes electrical energy, and is costly.

That is, the conventional hydrogen production process is disadvantageously large, costly, and low in energy conversion efficiency.

For this reason, there have been developed small, low-cost hydrogen production processes that simultaneously purify and compress hydrogen. As an example of such a process, Patent Literature 1 discloses a hydrogen compression process that purifies and compresses hydrogen-containing reformed gas. This process produces purified and compressed hydrogen on the cathode side from reformed gas supplied to the anode side by applying external electricity to the cell of a PEFC. This process is efficient and low-cost because it purifies and compresses hydrogen simultaneously and directly uses electrical energy as energy for purifying and compressing hydrogen.

Patent Literature 2 discloses a water electrolysis process that produces and compresses hydrogen by the electrolysis of water. This process produces compressed hydrogen on the cathode side by applying external electricity to the cell of a PEFC and thus electrolyzing water supplied to the anode side.

CITATION LIST

Patent Literature

Patent Literature 1 Japanese Patent No. 3358820
Patent Literature 2 Japanese Patent No. 4010193

SUMMARY OF INVENTION

Technical Problem

However, the conventional technologies disclosed in the above Literatures have room for improvement in the following respects:

The hydrogen compression apparatus of Patent Literature 1 can extract only hydrogen gas at a pressure of 10 atmospheres or less. The reason is as follows: this apparatus is a single cell and thus the electrode area is increased in proportion to increases in the amount of hydrogen produced; the sectional area to be sealed is simultaneously increased, making it extremely difficult to maintain air tightness; and when hydrogen is compressed to a pressure higher than 10 atmospheres, there occur problems such as the leakage of the gas from the hydrogen discharge passage. That is, the hydrogen compression apparatus of Patent Literature 1 is not sufficiently durable to extract hydrogen at a pressure of 700 to 1000 atmospheres, which are required by a hydrogen station.

The high-pressure hydrogen production apparatus of Patent Literature 2 can produce hydrogen at a high pressure of 350 atmospheres or more by fixing and maintaining a water electrolysis cell in a high-pressure container. However, this apparatus, which uses a great amount of electrical energy to electrolyze water, is less energy efficient and more costly than a system that purifies and compresses hydrogen from a reformed gas. Further, water electrolysis requires the use of a corrosion-resistant cell material and therefore the material cost is increased.

The present invention has been made to solve the above problems, and an object of the present invention is to provide a hydrogen purification/compression apparatus that endures even a high-pressure environment, and can purify and compress hydrogen recovered from reformed gas at low cost.

Solution to Problem

The present invention provides a hydrogen purification/compression apparatus for producing, from hydrogen-containing gas, purified hydrogen gas having a higher pressure and a higher purity than a pressure and a purity of the hydrogen-containing gas. The hydrogen purification/compression apparatus includes multiple stacked cell structures and a pressing structure configured to apply a clamping stress in a stacking direction of the cell structures. Each of the cell structures includes a polymer electrolyte membrane, an anode catalyst layer stacked on one side of the polymer electrolyte membrane, and a cathode catalyst layer stacked on the other side of the polymer electrolyte membrane. Each cell structure also includes an anode-side power feeder disposed outside the anode catalyst layer so as to be opposite to the anode catalyst layer and a cathode-side power feeder disposed outside the cathode catalyst layer so as to be opposite to the cathode catalyst layer. Each cell structure also includes an anode-side separator disposed outside the anode-side power feeder so as to be opposite to the anode-side power feeder and having a passage through which the hydrogen-containing gas is supplied and a cathode-side separator disposed outside the cathode-side power feeder so as to be opposite to the cathode-side power feeder and having a passage through which the purified hydrogen gas is discharged.

The hydrogen purification/compression apparatus preferably includes a high-pressure tank containing the cell structures and the pressing structure. The high-pressure tank is preferably filled with a gas medium, and a pressure of the gas medium is preferably kept higher than the pressure of the hydrogen-containing gas and lower than the pressure of the purified hydrogen gas.

Advantageous Effects of the Invention

The above hydrogen purification/compression apparatus endures even a high-pressure environment, and can purify and compress hydrogen recovered from reformed gas at low cost.

BRIEF DESCRIPTION OF THE DRAWINGS

FIG. 5 shows elastic conductive members disposed in cathode-side separators of hydrogen purification/compression apparatuses of (a) first embodiment and (b) third embodiment of the present invention.

FIG. 6($b$) is an enlarged view of a portion c; and FIG. 6($c$) is an enlarged view of a portion d.

DESCRIPTION OF EMBODIMENTS

Now, embodiments of the present invention will be described with reference to the drawings. Like components are given like reference signs throughout the drawings and description thereof will be omitted as appropriate.
<Overall Configuration of Hydrogen Production System>

Figure 1:
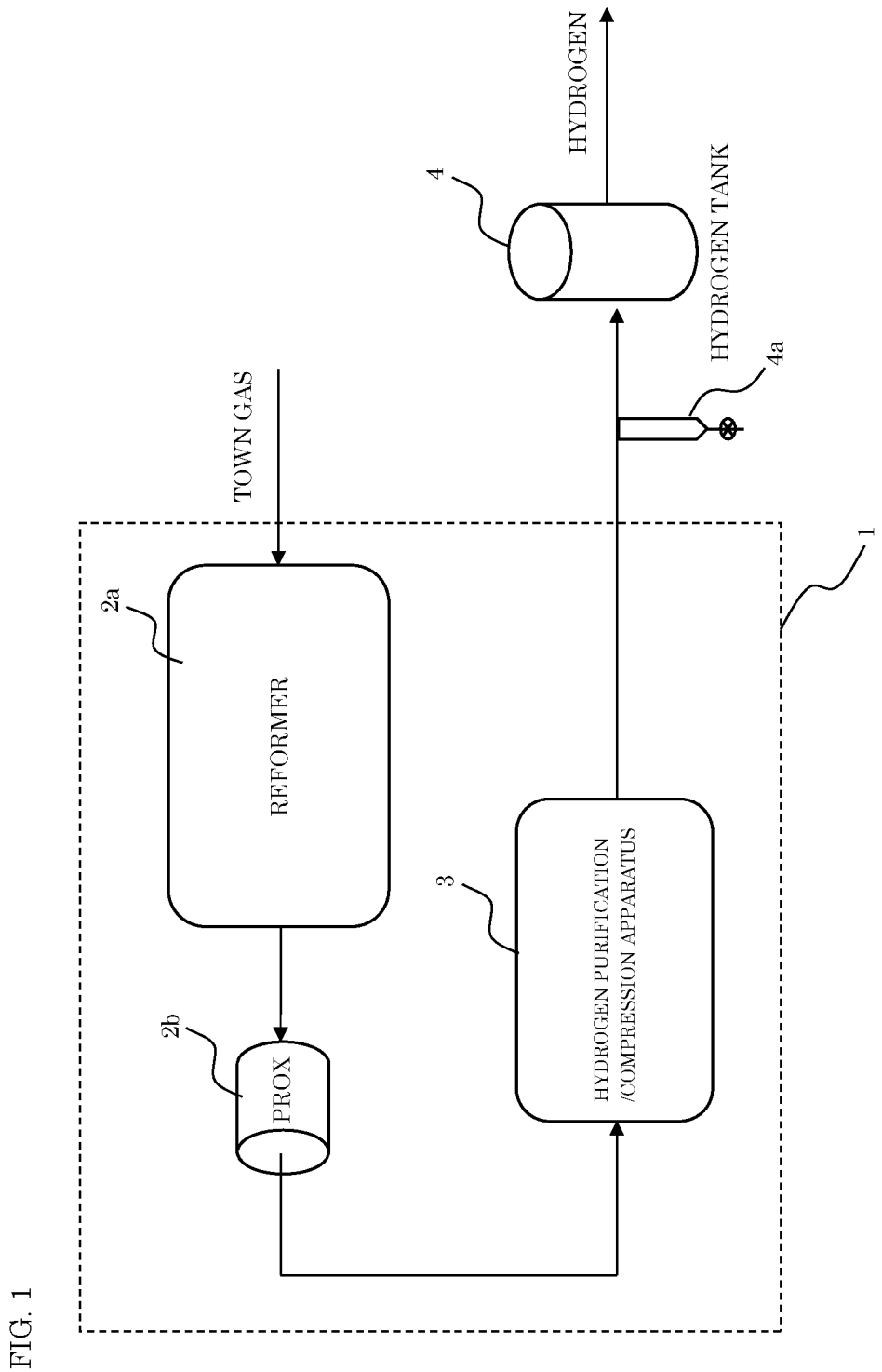
FIG. 1 is a block diagram of a hydrogen production system of embodiments of the present invention.

FIG. 1 shows a hydrogen production system 1 using a hydrogen purification/compression apparatus of embodiments of the present invention. The hydrogen production system 1 receives the supply of town gas from outside and produces high-purity, high-pressure hydrogen. The produced hydrogen is stored in a hydrogen tank 4 and supplied to fuel cell vehicles or the like.

As shown in FIG. 1, the hydrogen production system 1 includes a reformer 2$a$, a carbon monoxide preferential oxidation reactor (PROX) 2$b$, and a hydrogen purification/compression apparatus 3. It is also provided with a water trap drain apparatus 4$a$ and a hydrogen tank 4. The town gas supplied from outside contains methane as a main component and has a pressure of 1 to 10 atmospheres. The reformer 2$a$ decomposes methane and produces hydrogen by mixing steam with the town gas and exposing the mixture to a catalyst in a high-temperature environment. When the town gas is reformed, hydrogen, carbon monoxide, and carbon dioxide are produced.

It is not preferable to provide the reformed gas containing hydrogen, carbon monoxide, carbon dioxide, and steam produced by the reformer 2$a$ directly to the hydrogen purification/compression apparatus 3. The reason is that when the carbon monoxide contained in the reformed gas is supplied to the hydrogen purification/compression apparatus 3, the catalyst may degrade.

For this reason, the reformer 2$a$ supplies the reformed gas to the carbon monoxide preferential oxidation reactor 2$b$ to previously remove the carbon monoxide. The carbon monoxide preferential oxidation reactor 2$b$ receives the supply of the reformed gas, as well as air and then oxidizes the carbon monoxide in the reformed gas into carbon dioxide. It is preferred to use a metal honeycomb-supported PtFe/mordenite catalyst inside the carbon monoxide preferential oxidation reactor 2$b$.

The carbon monoxide preferential oxidation reactor 2$b$ then supplies the reformed gas containing the hydrogen, carbon dioxide, and steam to the hydrogen purification/compression apparatus 3.

Instead of the carbon monoxide preferential oxidation reactor 2$b$, a carbon monoxide preferential methanator may be used. In this case, a metal honeycomb-supported Ru or a metal honeycomb-supported V—Ni/alumina catalyst may be used inside the carbon monoxide preferential methanator. The carbon monoxide preferential oxidation reactor or carbon monoxide preferential methanator may be incorporated in the container of the reformer 2$a$.

The hydrogen purification/compression apparatus 3 purifies and compresses the hydrogen-containing reformed gas to extract hydrogen having a higher pressure and a higher concentration than the reformed gas. While it is assumed that the pressure of the reformed gas is 1 to 10 atmospheres, the pressure may fall outside this range. Theoretically, as the voltage applied between the anode and cathode of the hydrogen purification/compression apparatus 3 is increased to 60 mV, 120 mV, and 180 mV, the hydrogen is purified and compressed by factors of 10, 100, and 100. In principle, only hydrogen ions can permeate through the electrolyte membrane and therefore almost only hydrogen occurs at the cathode. A tiny portion of the gas other than hydrogen contained anode gas permeates through the membrane to the cathode side as impurities. The concentration of the impurities contained in the purified hydrogen is preferably 10 ppm or less, more preferably 5 ppm or less, even more preferably 1 ppm or less. The pressure of the compressed hydrogen is 750 atmospheres or more, preferably 850 atmospheres or more, even more preferably 1000 atmospheres or more. Note that the present compression apparatus may be used to compress high-purity, low-pressure hydrogen as described above.

The hydrogen produced by the hydrogen purification/compression apparatus 3 is stored in the hydrogen tank 4. The water trap drain apparatus 4 is disposed on the hydrogen passage between the hydrogen purification/compression apparatus 3 and hydrogen tank 4.

When the current passes through the hydrogen purification/compression apparatus 3, protons accompanied by water molecules in an anode catalyst layer 23 permeate through a polymer electrolyte membrane 40 to a cathode catalyst layer 33. Thus, osmotic water occurs in the cathode catalyst layer 33. The water trap drain apparatus 4a is disposed on the hydrogen passage in order to effectively remove this water from the hydrogen.

The water trap drain apparatus 4a includes a pair of water traps with drain valves. It drains water while alternately switching between the water traps. Thus, it is possible to remove water from the hydrogen passage even during the continuous operation of the hydrogen purification/compression apparatus 3 and thus to increase the hydrogen purity.

When the hydrogen tank 4 is connected to the fuel tank of a fuel cell vehicle, the hydrogen in the hydrogen tank 4 is supplied to the fuel cell vehicle due to the pressure difference.

Figure 2:
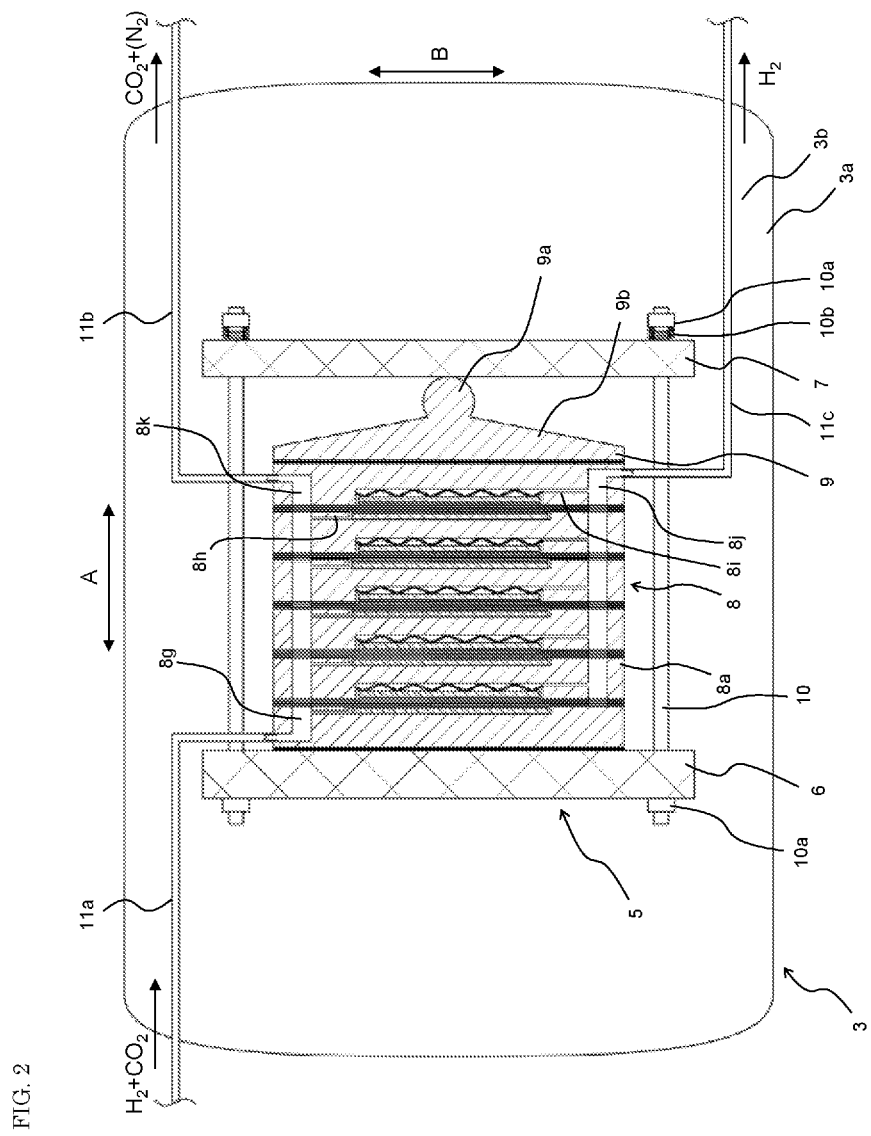
FIG. 2 is a schematic diagram of a hydrogen purification/compression apparatus of a first embodiment of the present invention.

First Embodiment: Series Hydrogen Purification/Compression Apparatus 1-1: Overall Configuration of Hydrogen Purification/Compression Apparatus FIG. 2 shows a schematic diagram of a hydrogen purification/compression apparatus 3 of a first embodiment of the present invention. In the hydrogen purification/compression apparatus 3, a high-pressure tank 3a is filled with compressed air, preferably compressed nitrogen gas, having a pressure of 100 atmospheres and contains stacked cell structures 8. The compressed air or compressed nitrogen gas has a pressure higher than hydrogen-containing gas and lower than hydrogen gas obtained by purifying the hydrogen-containing gas. Thus, by reducing the pressure difference between a hydrogen gas discharge passage 11c and the high-pressure tank 3a, the leakage of the high-pressure hydrogen is prevented. The high-pressure tank also contains a hydrogen sensor so that a hydrogen leak can be quickly detected.

The stacked cell structures 8 are fixed by a pressing structure that includes a base plate 6 and a clamp plate 7 and applies a clamping stress to the stacked cell structures 8 in the stacking direction thereof. A press jig 9 is disposed between the clamp plate 7 and cell structures 8.

The base plate 6 is disposed at one edge of the stacked cell structures 8, and the clamp plate 7 is disposed at the other edge thereof. The clamp plate 7 is clamped to the base plate 6 by a bolt 10, a press spring 10b, and a nut 10a with the stacked cell structures 8 therebetween. The surface opposite to the press jig 9, of the clamp plate 7 has a spherical recess (not shown) in the center thereof. The press jig 9 is in the shape of a flat pyramid (or cone) and has a spherical protrusion 9a fittable into the spherical recess of the clamp plate 7 (not shown) in the center of the surface opposite to the clamp plate 7 thereof. The bottom surface adjacent to the cell structures 8, of the press jig 9 has the same shape as an end surface of the cell structures 8. That is, the press jig 9 contacts the clamp plate 7 at one point and contacts the cell structure 8 with the entire surface.

In the cell structures of the present embodiment thus configured, the clamping force of the entire clamp plate 7 acts on the spherical protrusion 9a in the center of the upper surface of the press jig 9 in a concentrated manner even when some variation occurs in the clamping torque produced by the bolt 10 and nut 10a clamping the clamp plate 7. Thus, the entire surface of the stacked cell structures 8 is pressed by the press jig 9 with a uniform surface pressure. That is, unevenness in surface pressure does not occur. Even when the nut 10a is loosened due to a temperature rise or vibration, the press jig 9 is pressed by the press spring 10b. This prevents a reduction in the clamping pressure acting on the cell structures 8. This prevents the loss of the air tightness of the stacked cell structures 8 and an increase in contact resistance. Accordingly, a loss resulting from an increase in contact resistance does not occur.

The hydrogen purification/compression apparatus 3 receives the supply of reformed gas through a reformed gas supply passage 11a, and purifies and compresses hydrogen in the stacked cell structures 8. The purified and compressed hydrogen is supplied to the hydrogen tank (not shown) through the hydrogen gas discharge passage 11c. The hydrogen-removed reformed gas is mainly composed of carbon dioxide and steam and is discharged through a reformed gas discharge passage 11b.

As seen above, the hydrogen purification/compression apparatus 3 does not use a liquid and therefore can be installed with the upper part thereof oriented in any direction. The hydrogen purification/compression apparatus 3 differs from a water-electrolysis hydrogen compression apparatus, which uses water, because, in the case of the latter apparatus, a water supply passage has to be disposed vertically below the apparatus and therefore the installation orientation thereof is determined. Note that condensed water may occur in the hydrogen purification/compression process. For this reason, as shown in FIG. 2, it is preferred to install the hydrogen purification/compression apparatus 3 in an orientation such that the hydrogen gas discharge passage 11c lies below the high-pressure tank 3a.

While five cell structures 8 are stacked in FIG. 2, the number of stacked cell structures 8 may be set to any number in accordance with the area of the cell structures 8 and the required quantity of electricity supplied.

In typical hydrogen station applications, it is often necessary to produce hydrogen at 100 $Nm^3H_2/h$. For this reason, when cells having a current density of 1.33 $A/cm^2$ are used, it is preferred to use two cell stacks in which 100 cells having an electrode sectional area of 30×30 $cm^2$ are stacked or eight cell stacks in which 100 cells having an electrode sectional area of 15×15 $cm^2$ are stacked.

In typical household hydrogen storage applications, it is often necessary to produce hydrogen at 0.5 $Nm^3H_2/h$. For this reason, when cells having a current density of 1.33 $A/cm^2$ are used, it is preferred to use a cell stack in which four cells having an electrode sectional area of 15×15 $cm^2$ are stacked.

As the number of stacked cell structures 8 is increased, the area of the passage of the separator of each cell structure 8 is reduced. The product of the passage area and the pressure is proportional to the required clamping pressure. Accordingly, by increasing the number of stacked cell structures 8 and thus reducing the passage area of each separator, it is possible to reduce the clamping pressure required to clamp the stacked cell structures 8.

1-2: Detailed Description of Cell Structure

Figure 3:
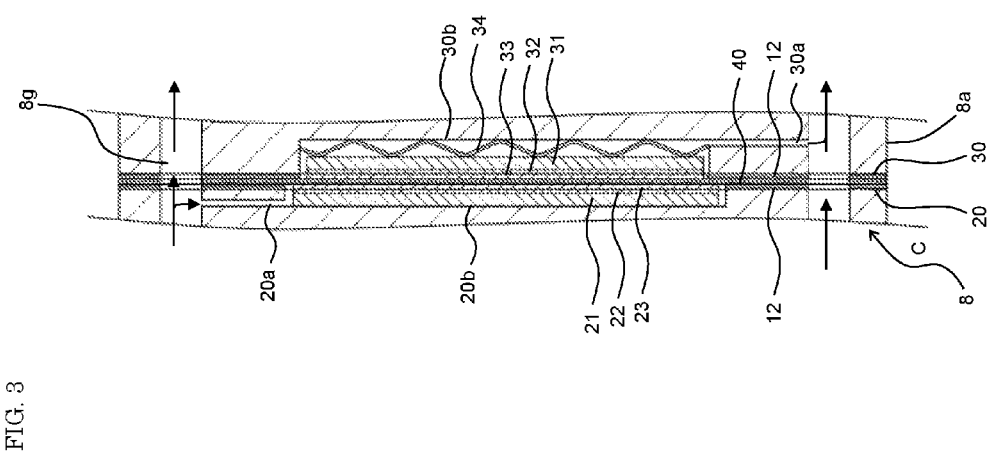
FIG. 3 is a sectional view of a unit cell of the hydrogen purification/compression apparatus of the first embodiment of the present invention.

Referring to FIG. 3, details of the cell structure 8 will be described. FIG. 3 shows one cell structure 8. The cell structure 8 is separated by separators 8a. A polymer electrolyte membrane 40 is sandwiched between the separators 8a. Gaskets 12 are disposed between a pair of opposite flat portions formed on an anode-side separator 20 and a cathode-side separator 30. When the gaskets 12 are pressed, the opposite separators 8a are sealed.

In the present embodiment, each separator 8a is formed so as to have a rectangular section. Forming separators having a rectangular section advantageously allows for the efficient use of the separator material. While examples of a rectangular section include various rectangular sections, including a square section, a square section is particularly preferable to improve the pressure resistance. Forming the separators 8a, as well as an anode-side passage 20b, a cathode-side passage 30b, and the like so as to have a rectangular section is preferable to efficiently use the separator material. In this case, by forming the press jig 9 in a rectangular pyramidal or cone shape whose bottom has the same shape as the separator, the press jig 9 can contact the cell structures 8 with the entire surface so that it can apply approximately a uniform pressure thereto.

An anode catalyst layer 23 is stacked on one side of the polymer electrolyte membrane 40, and a cathode catalyst layer 33 is stacked on the other side thereof.

A conductive water-repellent layer 22 is stacked outside the anode catalyst layer 23. An anode-side power feeder 21 is disposed outside the conductive water-repellent layer 22 so as to be opposite to the anode catalyst layer 23. The anode-side separator 20 is disposed outside the anode-side power feeder 21 so as to have a passage 20b through which reformed gas from a reformed gas supply part 20a is supplied.

A conductive water-repellent layer 32 is stacked outside the cathode catalyst layer 33. A cathode-side power feeder 31 is disposed outside the conductive water-repellent layer 32 so as to be opposite to the cathode catalyst layer 33. The cathode-side separator 30 is disposed outside the cathode-side power feeder 31 so as to have a passage 30b through which purified hydrogen is discharged to a hydrogen gas discharge part 30a. An elastic conductive member 34 which is at least partially conductive and applies a load in the stacking direction of the cell structures 8 is disposed between the cathode-side power feeder 31 and the passage 30b of the cathode-side separator 30.

The passage 30b of the cathode-side separator 30 is formed with a size such that it falls within the passage 20b of the anode-side separator 20 in a plane parallel with the polymer electrolyte membrane 40.

Due to this configuration, the anode and cathode sides of the polymer electrolyte membrane 40 are physically separated from each other by the polymer electrolyte membrane 40 and sealed. For this reason, gas cannot permeate through the polymer electrolyte membrane 40 to travel between the anode and cathode sides thereof. The polymer electrolyte membrane 40 is an ionic conductor. In the present embodiment, hydrogen ions can permeate through the polymer electrolyte membrane 40 to travel between the anode and cathode sides thereof.

Hereafter, the elements included in this cell structure will be described in detail.

(i) Polymer Electrolyte Membrane

In the present embodiment, a proton (hydrogen ion)-conductive solid material is used as the polymer electrolyte membrane 40. Use of a proton (hydrogen ions)-conductive solid material advantageously allows hydrogen to be produced in the cathode-side passage when applying a current to the polymer electrolyte membrane 40. Specifically, a fluorocarbon-based electrolyte reinforced with a polymer nonwoven fabric or fibril or glass fiber [perfluorosulfonic acid (PFSA) membrane, Nafion® (available from DuPont), etc.] or a hydrocarbon-based electrolyte membrane [sulfonated polyether ketone phosphine oxide (SPEKP), sulfonated polyether ketone block copolymer (SPK-b1-1), sulfonated polyether ether ketone (SPEEK), etc.] is used as the polymer electrolyte membrane 40. It is most preferable to use a hydrocarbon-based electrolyte membrane, through which gas is less likely to permeate.

(ii) Catalyst Layers

As described above, the anode catalyst layer 23 is stacked on one side of the polymer electrolyte membrane 40, and the cathode catalyst layer 33 is stacked on the other side thereof. A porous material which can decompose hydrogen into protons (hydrogen ions) and electrons is used as the anode catalyst layer 23. Use of a porous material which can decompose hydrogen into protons (hydrogen ions) and electrons allows hydrogen to be efficiently decomposed in the anode catalyst layer. Specifically, the anode catalyst layer 23 is formed by thinly coating the polymer electrolyte membrane 40 with a plain Pt or PtRu alloy particulate catalyst supported on carbon black (Pt/CB or PtRu/CB). In particular, a PtRu/CB catalyst has high CO oxidation activity and high poisoning resistance and therefore is useful when the carbon monoxide preferential oxidation reactor may not have completely removed CO. On the other hand, the cathode catalyst layer 33 is formed by thinly coating the polymer electrolyte membrane 40 with a plain Pt particulate catalyst supported on the carbon black (Pt/CB). Further, in the anode catalyst layers 23 and 33, the carbon black-supported particulate catalyst is thinly coated with PFSA.

Due to these configurations, three-phase zone interfaces in which a catalyst particle surface, a gaseous hydrogen passage, and the electrolyte surface of the polymer electrolyte membrane 40 contact each other are formed in the anode catalyst layer 23 and cathode catalyst layer 33. Thus, hydrogen oxidation reaction proceeds smoothly in the anode catalyst layer 23, and hydrogen production reaction proceeds smoothly in the cathode catalyst layer. That is, the above configurations advantageously increase the reaction activities of the anode catalyst layer 23 and cathode catalyst layer 33. The increases in the reaction activities reduce the amounts of usage of the precious metals (Pt, Ru) used in the catalyst layers. Thus, the costs of the catalyst layers can be reduced.

The catalyst layers 23 and 33 are formed by coating the respective surfaces of the polymer electrolyte membrane 40 with a mixture of a catalytic metal, a conductive material, and an electrolyte material as described below. Forming the catalyst layers in such a manner advantageously allows for obtaining high reactivity while suppressing the amounts of usage of the catalytic metals.

Specifically, first, a mixture of Pt/CB or PtRu/CB, pure water, and ethanol is crushed and mixed using a ball mill. A 5 w % Nafion solution (e.g., Nafion/CB=0.7 to 1.0) is added to the mixture and further crushed and mixed using the ball mill. Thus, a catalyst layer ink is prepared.

Then, the catalyst layer ink is applied to the respective surfaces of the polymer electrolyte membrane 40 using a swirl spray apparatus. Thus, the anode catalyst layer 23 is formed on one surface of the polymer electrolyte membrane 40, and the cathode catalyst layer 33 is formed on the other surface thereof. Then, the polymer electrolyte membrane 40 having the anode catalyst layer 23 and cathode catalyst layer 33 formed thereon is dried in vacuo at 100° C. and then hot pressed at 130° C. and 50 MPa. Thus, a catalyst coated membrane (CCM) is prepared.

The amount of the supported catalytic metal is 0.02 to 0.5 mg/cm$^2$, preferably 0.05 to 0.2 mg/cm$^2$, more preferably 0.08 to 0.12 mg/cm$^2$. In particular, 0.1 mg/cm$^2$ of the supported catalytic metal is used in terms of cost-performance balance.

(iii) Conductive Water-Repellent Layers

As described above, the porous conductive water-repellent layer 22 is disposed between the anode catalyst layer 23 and anode-side power feeder 21, and the porous conductive water-repellent layer 32 is disposed between the cathode catalyst layer 33 and cathode-side power feeder 31. The conductive water-repellent layers 22 and 32 are highly-conductive, porous, corrosion-resistant and have smooth surfaces. The reformed gas is dispersed in the anode-side conductive water-repellent layer 22 so that the reformed gas is uniformly supplied to the anode catalyst layer 23. The conductive water-repellent layers 22 and 32 thus configured advantageously can prevent the corrosion of the metal of the power feeder due to electro-chemical reaction that occurs in the anode catalyst layer, as well as allows for smooth and uniform movement of the reformed gas to the anode catalyst layer 23 and for the discharge of produced hydrogen from the cathode catalyst layer 33 without increasing the resistance of the current supplied from the power feeder.

The conductive water-repellent layers 22 and 32 are formed integrally with the anode-side power feeder 21 and/or cathode-side power feeder 31 by crushing and mixing a mixture of a carbon material, a surfactant, and a fluororesin polymer dispersion diluent, applying the resulting mixture to the anode-side power feeder 21 and/or cathode-side power feeder 31, and drying and pressing the applied mixture.

Specifically, first, a mixture of carbon black serving as a carbon material, 10 to 20% of Triton serving as a surfactant, and a PTFE or fluorinated ethylene/propylene copolymer (FEP) dispersion diluent serving as a fluororesin is crushed and mixed using a ball mill. The ratio of carbon black to the fluororesin is preferably ¼ to ⅔.

The ink for conductive water-repellent layers thus prepared is then applied to either surface of the anode-side power feeder 21 and/or cathode-side power feeder 31 using a swirl spray apparatus. The surfactant is removed in a nitrogen atmosphere at 280° C. and then the resulting ink is hot pressed at 300° C. and 50 MPa. Thus, the conductive water-repellent layers 22 and 32 are formed integrally with the anode-side power feeder 21 and/or cathode-side power feeder 31. The thicknesses of the conductive water-repellent layers 22 and 32 are for example, 20 to 100 μm, preferably 40 to 80 μm, more preferably 55 to 65 μm. The porosity of the conductive water-repellent layers 22 and 32 is preferably 30 to 80%, more preferably 40 to 70%, even more preferably 50 to 60%. The method for producing the conductive water-repellent layers 22 and 32 described above advantageously allows for the production of low-cost, high-quality conductive water-repellent layers.

(iv) Power Feeder

As described above, the anode-side power feeder 21 is disposed outside the anode catalyst layer 23 so as to be opposite to the anode catalyst layer 23 (with the conductive water-repellent layer 22 therebetween), and the cathode-side power feeder 31 is disposed outside the cathode catalyst layer 33 so as to be opposite to the cathode catalyst layer 33 (with the conductive water-repellent layer 32 therebetween). A conductive material having a predetermined porosity is used as the anode-side power feeder 21 and cathode-side power feeder 31. Such materials advantageously have both high conductivity and gas dispersion characteristics. Of such materials, a highly-conductive, porous, and corrosion-resistant material having a smooth surface is preferred. Specifically, a metal sintered compact porous sheet (PMS) is used as the anode-side power feeder 21 and cathode-side power feeder 31. Preferably, a PMS is used which has been quenched in order to suppress the creep deformation of the PMS when exposed to a highly compressed environment and whose power feed contact surface has been subjected to a resistance reduction process such as plating.

When the conductive water-repellent layers 22 and 32 are formed on the anode-side power feeder 21 and cathode-side power feeder 31, the metal sintered compact porous sheet need not necessarily be a corrosion-resistant metal. For example, an inexpensive metal such as Cu may be used as the metal sintered compact porous sheet.

(v) Series Electrical Connection

Referring to FIG. 4(a), the electrical connection between the cell structures 8 will be described. In the present embodiment, as shown in FIG. 4(a), multiple stacked cell structures 8 are electrically connected in series. In each stacked cell structure 8, the anode-side separator 20, anode-side power feeder 21, anode-side conductive water-repellent layer 22, and anode catalyst layer 23 are electrically connected. Also, the cathode-side separator 30, elastic conductive member 34, cathode-side power feeder 31, cathode-side conductive water-repellent layer 32, and cathode catalyst layer 33 are electrically connected.

The polymer electrolyte membrane 40 and gasket 12 are non-conductive and electrically insulated. On the other hand, the polymer electrolyte membrane 40 is an ionic conductor and therefore conducts hydrogen ions. Thus, charge is carried from the anode side to the cathode side.

Accordingly, as shown in FIG. 4(a), by connecting the positive electrode 13 of an external power supply 15 to the anode-side separator 20 of a stacked cell structure 8 serving as one end, connecting the negative electrode 14 of the external power supply 15 to the cathode-side separator 30 of a stacked cell structure 8 serving as the other end, and supplying hydrogen-containing gas to the anode-side separator 20, the multiple stacked cell structures 8 are energized in series. That is, the external power supply 15 and the multiple stacked cell structures 8 are electrically connected in series. The stacked cell structures 8 electrically connected in series as described above advantageously can omit the connection of the power feed terminals between the cells to the power supply compared to when cell structures are not stacked and thus can operate with a relatively high voltage.

Hydrogen whose pressure has been increased to up to a predetermined pressure in accordance with a voltage applied by the external power supply 15 is produced in the cathode-side separator 30. As the voltage applied by the external power supply 15 is increased, the pressure of hydrogen produced in the cathode-side separator 30 is increased.

(vi) Elastic Conductive Member

Referring to FIG. 5(a), the specific shape of the elastic conductive member 34 will be described. As described above, the conductive member 34 which is at least partially conductive and applies a load in the stacking direction of the cell structures 8 is disposed between the cathode-side power feeder 31 and the passage 30b of the cathode-side separator 30. The conductive member 34 is shaped so that it is contained in the passage 30b, and has a wave shape 34a formed by bending a rectangular plate. The wave shape 34a is elastically deformed when incorporated into the cell structure 8. Thus, it applies a load in the stacking direction of the cell structures.

Owing to this configuration, the conductive member 34 applies a load to the cathode-side separator 30 and cathode-side power feeder 31. This can prevent the cathode-side power feeder 31 from floating over the cathode-side separator 30 or cathode catalyst layer 33 and thus degrading the electrical contact.

(vii) Sealing Structure

Figure 6:
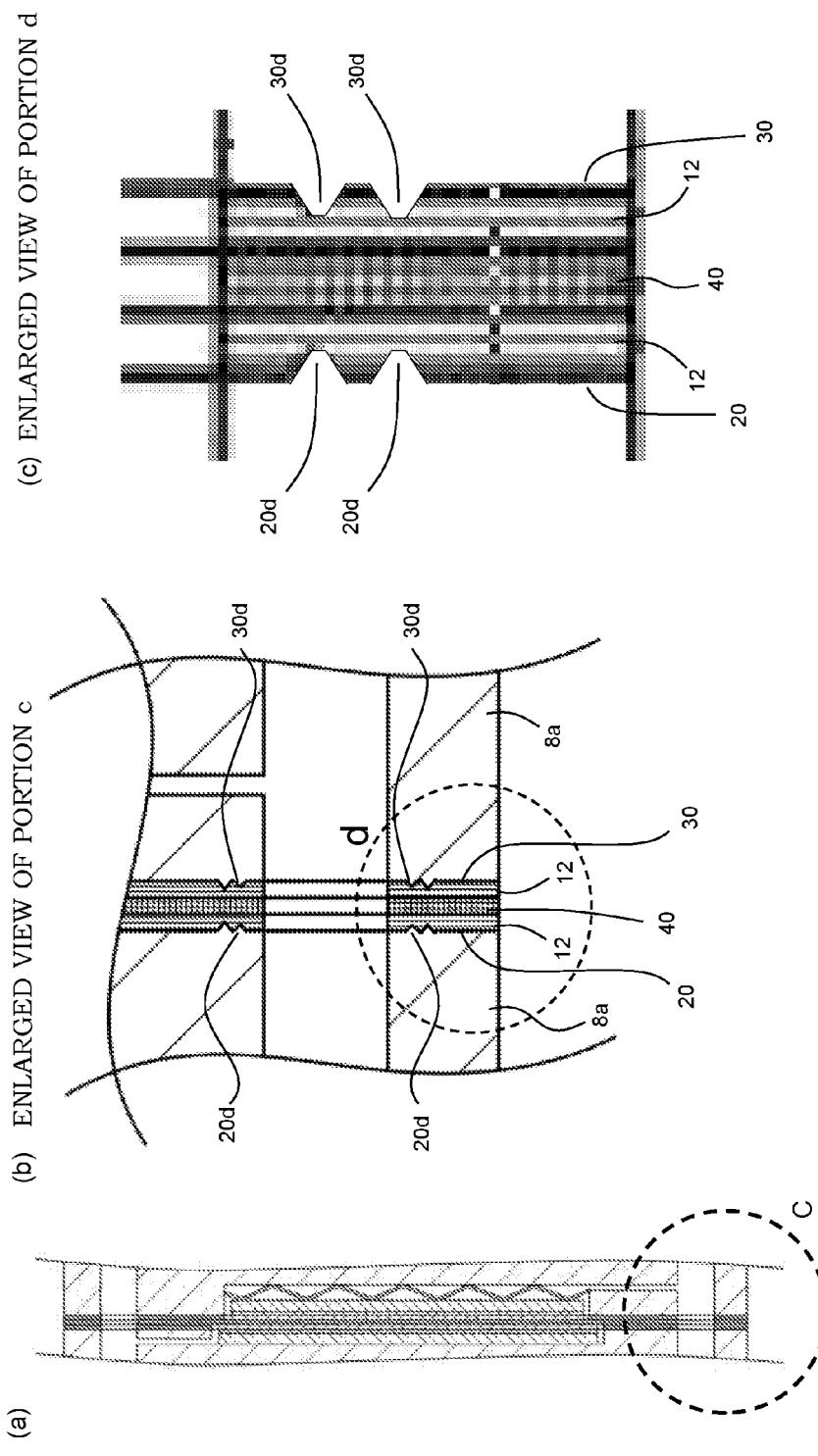
FIG. 6($a$) is a sectional view of a unit cell of the hydrogen purification/compression apparatus of the first embodiment of the present invention.
Figure 9:
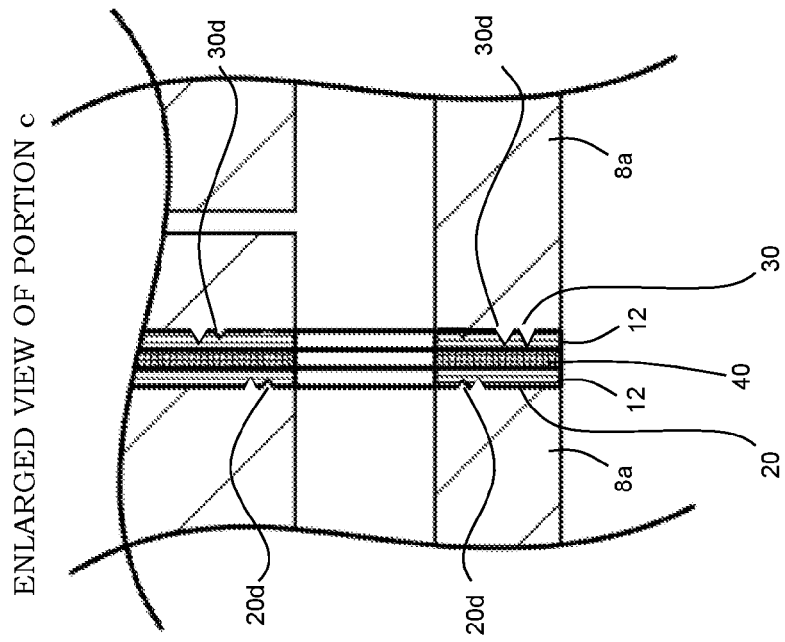
FIG. 9 is an enlarged view of the portion c in FIG. 6($a$), which shows a modification of a sealing structure shown in FIG. 6($b$).

Referring to FIG. 6, details of the sealing structure will be described. Each cell structure 8 is sealed when the sealing portions between the separators 8a are pressed by the gaskets 12. In this sealing structure, annular protrusions 20d and 30d are formed on both or one of a pair of opposite flat portions of the anode-side separator 20 and cathode-side separator 30, and the annular protrusions 20d and 30d press the gaskets 12. Thus, this sealing structure has high sealability. As shown in FIG. 9, the annular protrusions 20d and 30d may be disposed in positions such that the protrusions do not press each other. Multiple annular protrusions 20d and multiple annular protrusions 30d may be disposed. Multiple protrusions having different shapes or sizes may be disposed.

Specifically, the annular protrusions 20d and 30d have triangular sections. Preferably, each triangular shape is a regular triangle or an isosceles triangle having a rounded vertex whose angle is 30 to 150°. When the vertices are rounded, damage to the gaskets 12 is prevented. The annular protrusions 20d and 30d are formed by notching the flat portions of the anode-side separator 20 and cathode-side separator 30.

The sealing structure is composed of the reformed gas supply passage, the periphery of the reformed gas discharge passage, and the perimeter of the passage of the separator. The sealing structure thus configured maintains high sealability even when the seal surface is tilted to some extent. Further, this sealing structure eliminates the need to provide an O ring on the seal surface and therefore cost can be reduced.

(viii) Anode-Side Passage

Referring to FIG. 7(a), the anode-side passage 20b formed on the anode-side separator 20 will be described. The anode-side passage 20b has a reformed gas inlet 8c and a reformed gas outlet 8d. The anode-side passage 20b also has a groove 8f and a wall 8e to facilitate the dispersion of the reformed gas therein. The presence of the groove 8f and wall 8e prevents the distribution of high concentrations in the anode-side passage 20b and the discharge of an unreacted reformed gas to the reformed gas outlet 8d. The reformed gas is supplied to the anode catalyst layer 23 through the porous metal sheet (anode-side power feeder 21) provided with the conductive water-repellent layer having the same shape as the anode-side passage 20b.

(viii) Cathode-Side Passage

Figure 7:
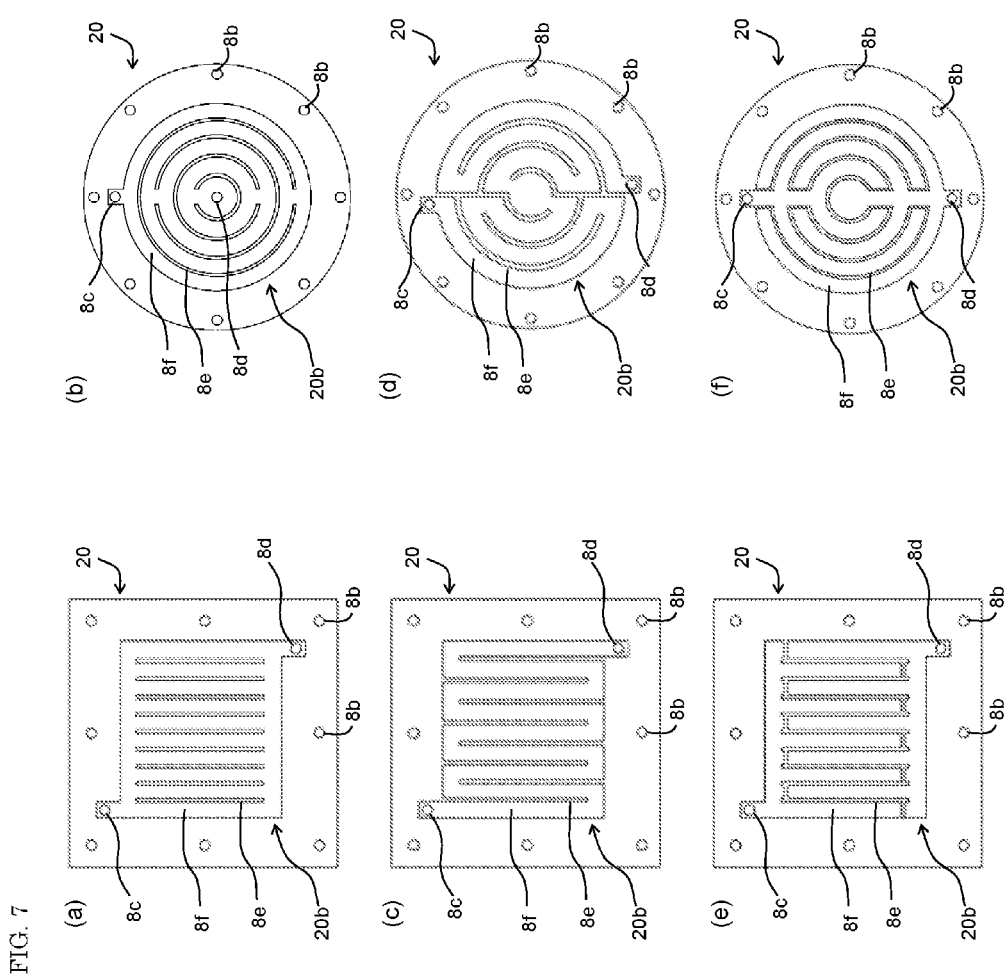
FIGS. 7($a$) to 7($f$) are anode-side side views of anode-side separators.
Figure 8:
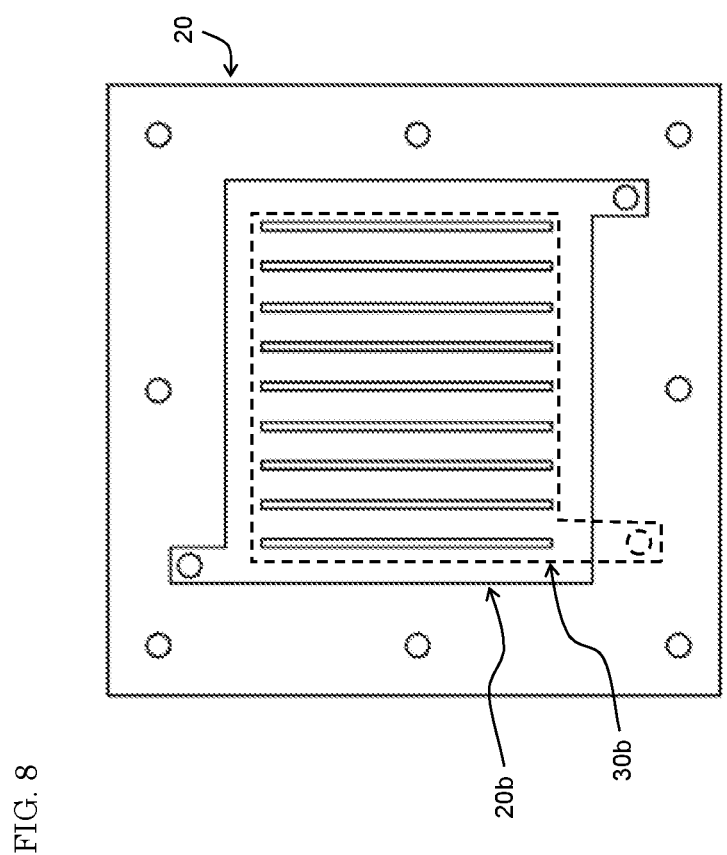
FIG. 8 is a cathode-side side view of a cathode-side separator opposite to the anode-side separator in FIG. 7($a$).

Referring to FIG. 8, there will be described the cathode-side passage 30b formed on the cathode-side separator 30 opposite to the anode-side separator 20 shown in FIG. 7(a). As described above, the cathode-side passage 30b of the cathode-side separator 30 is formed with a size such that it falls within the passage 20b of the anode-side separator 20 in a plane parallel with the polymer electrolyte membrane 40. Specifically, as shown in FIG. 8, the cathode-side passage 30b (dotted line) is formed by uniformly shrinking the anode-side passage 20b using the same passage center. This configuration advantageously makes the electrolyte membrane less likely to be broken even when high-pressure hydrogen is produced in the cathode-side passage 30b. Purified hydrogen gas produced in the cathode catalyst layer 33 is discharged to the hydrogen gas discharge passage through the porous metal sheet (cathode-side power feeder 31) provided with the conductive water-repellent layer having the same shape as the cathode-side passage 30b.

<Effects>

Thanks to the above configuration, the hydrogen purification/compression apparatus 3 of the present embodiment produces the following advantageous effects:

(1) The hydrogen purification/compression apparatus 3 of the present embodiment does not use water unlike the conventional art that produces high-pressure hydrogen by water electrolysis, described in Patent Literature 2. Thus, the elements of the cell structures 8 are less likely to be corroded. This eliminates the need to use a corrosion-resistant cell material and therefore cost can be reduced.

(2) Since the multiple cell structures 8 are stacked, the areas of the passages (anode-side passage 20b and cathode-side passage 30b) of each cell structure 8 are reduced. Thus, the clamping stress in the stacking direction of the cell structures 8 is reduced. As a result, the hydrogen purification/compression apparatus 3 of the present embodiment can compress hydrogen to 750 atmospheres or more, preferably 850 atmospheres or more, more preferably 1000 atmospheres or more, which are often required in hydrogen station applications.

(3) The heating value of the hydrogen purification/compression apparatus 3 of the present embodiment is lower than that of the conventional art that produces high-pressure hydrogen by water electrolysis, described in Patent Literature 2. Further, the reformed gas passing through the anode-side passage 20b cools the polymer electrolyte membrane 40. Accordingly, there is no need to provide each cell structure 8 with a cooler.

(4) The cathode-side passage 30b is formed with a size such that it falls within the anode-side passage 20b. This prevents the polymer electrolyte membrane 40 from being broken due to the pressure difference between the anode-side passage 20b and cathode-side passage 30b when high-pressure hydrogen is produced in the cathode-side passage 30b.

(5) The conductive member 34 applies a load to the cathode-side separator 30 and cathode-side power feeder 31. This prevents the cathode-side power feeder 31 from floating over the cathode-side separator 30 or cathode catalyst layer 33 and thus degrading the electrical contact.

(6) The conductive water-repellent layer 22 (32) is disposed between the power feeder 21 (31) and catalyst layer 23 (33). This can prevent the power feeder 21 (31) from being corroded due to the influence of the catalyst layer 23 (33).

(7) The annular protrusions 20d and 30d press the gaskets 12. Thus, sealability is improved compared to that when the flat portions press the gasket 12, thereby eliminating the need to seal the cell structure 8 using an O ring. Further these protrusions can prevent the gaskets 12 from being pushed out by the pressure of hydrogen produced in the cathode-side passage 30b. Furthermore, by providing a protrusion structure having one layer or adjacent two or more layers and pressing such a protrusion structure against the gaskets, the pressure applied to the gaskets is increased and thus sealability is further improved.

(8) The press jig 9 contacts the clamp plate 7 at one point. Thus, even when the clamping torque with which the clamp plate 7 is clamped varies to some extent or even when the clamping torque is reduced due to a reduction in the pressure of produced hydrogen, a temperature rise, or vibration, the press jig 9 can press the entire surface of the cell structure 8 with a uniform surface pressure in the collaboration with the press spring 10b.

Second Embodiment: Parallel Connection

A hydrogen purification/compression apparatus 3 of a second embodiment has a configuration and effects basically similar to those of the hydrogen purification/compression apparatus 3 of the first embodiment except that multiple stacked cell structures 8 are electrically connected in parallel. For this reason, the similar configuration and effects will not be described.

Figure 4:
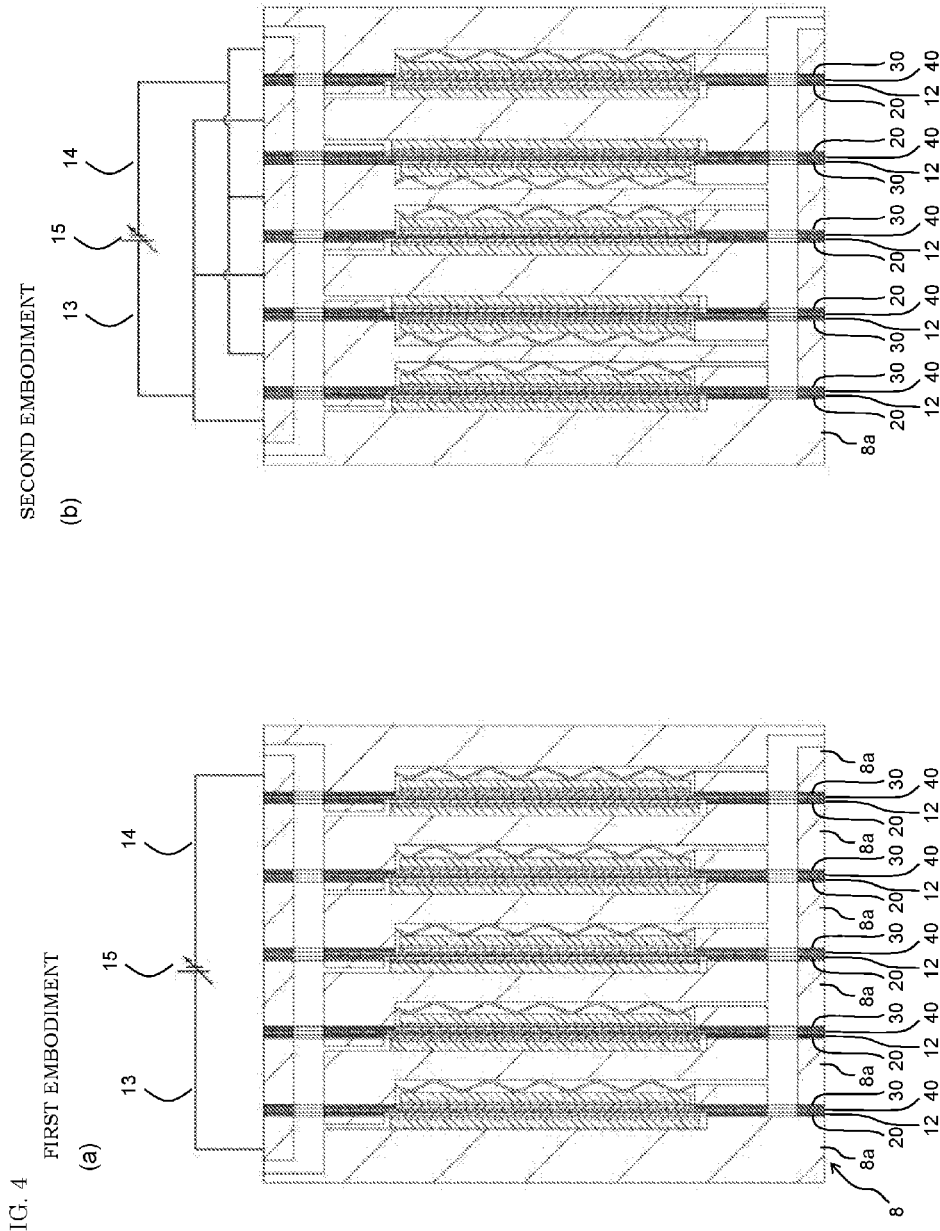
FIG. 4 includes circuit diagrams of hydrogen purification/compression apparatuses of (a) first embodiment and (b) second embodiment of the present invention.

Referring to FIG. 4(*a*), there will be described the electrical connection between the cell structures 8 of the hydrogen purification/compression apparatus 3 of the second embodiment of the present invention. For the separators 8*a* of the first embodiment, the anode-side separator 20 is formed on one side of each separator 8*a*, and the cathode-side separator 30 is formed on the other side thereof. For separators 8*a* of the present embodiment, on the other hand, anode-side separators 20 are formed on both surfaces of one separator 8*a*, and cathode-side separators 30 are formed on both surfaces of an adjacent another separator.

Accordingly, by connecting the positive electrode 13 of an external power supply 15 to the respective anode-side separators 20 of the stacked cell structures 8, connecting the negative electrode 14 of the external power supply 15 to the respective cathode-side separators 30 thereof, and supplying hydrogen-containing gas to the anode-side separators 20, the stacked cell structures 8 are energized in parallel. That is, the external power supply 15 and stacked cell structures 8 are electrically connected in parallel.

The hydrogen purification/compression apparatus 3 thus configured produces the following advantageous effects:

(1) The cell structures 8 are electrically connected in parallel. Thus, when any cell fails, it is possible to continue power generation by using the other cell structures 8. Accordingly, an improvement in continuous operability is expected.

(2) The cell structures 8 are electrically connected in parallel. Thus, when any cell fails, it is easy to electrically identify the failed cell. Accordingly, maintainability is improved.

Third Embodiment: When Cell Structure has Circular Section

A hydrogen purification/compression apparatus 3 of a third embodiment has a configuration and effects basically similar to those of the hydrogen purification/compression apparatus 3 of the first embodiment except that each cell structure 8 has a circular section. For this reason, the similar configuration and effects will not be described.

Referring to FIGS. 5(*b*) and 7(*b*), there will be described the hydrogen purification/compression apparatus 3 of the third embodiment of the present invention. In the present embodiment, each cell structure 8 has a circular section. In this case, an elastic conductive member 34 has a concentric wave shape 34*a* as shown in FIG. 5(*b*). An anode-side passage 20*b* formed on an anode-side separator 20 is a spiral passage as shown in FIG. 7(*b*). Reformed gas supplied from a reformed gas inlet 8*c* formed at an end of the anode-side passage 20*b* is discharged from a reformed gas outlet 8*d* formed in the center of the anode-side passage 20*b*.

The cell structures 8 having such circular sections have high sealability and pressure resistance. Further, when the cell structures 8 are disposed in a cylindrical high-pressure tank 3*a*, useless space is less likely to occur. Thus, the hydrogen purification/compression apparatus 3 can be downsized. Further, the cylindrical separators can be easily obtained by machining using a lathe. This high machinability is also an advantage.

<Modifications>

Next, referring to FIGS. 7(*c*) to 7(*f*), variations in the passage shape of the separator will be described. As shown in FIGS. 7(*c*) and 7(*d*), in the passage of the separator, the reformed gas passage 8*f* extending from the reformed gas inlet 8*c* to the reformed gas outlet 8*d* may be meandering. When the reformed gas passage 8*f* is meandering, the time during which the reformed gas stays in the anode-side passage 20*b* is increased. Thus, the proportion of hydrogen which reacts in the anode catalyst layer 23, of hydrogen in the reformed gas is increased.

As shown in FIGS. 7(*e*) and 7(*f*), in the passage of the separator, the passage need not communicate with the reformed gas inlet 8*c* or reformed gas outlet 8*d*. In this case, the reformed gas flowing in from the reformed gas inlet 8*c* temporarily is dispersed in the anode-side power feeder 21, anode-side conductive water-repellent layer 22, or anode catalyst layer 23 and then flows into the anode-side passage 20*b* adjacent to the reformed gas outlet 8*d*. A permeable passage wall may be used. Thus, it is possible to improve the dispersion ability of the reformed gas and thus to prevent a lack of moisture in the gas. Even with this passage shape, the reformed gas is uniformly distributed in the anode-side passage 20*b* and hydrogen in the reformed gas is consumed, the flow rate can be kept uniform by reducing the originally required passage length. Thus, the proportion of hydrogen which reacts in the anode catalyst layer 23, of hydrogen in the reformed gas is increased.

While the embodiments of the present invention have been described with reference to the drawings, the embodiments are only illustrative. Various configurations other than those described above can be employed.

For example, while the hydrogen purification/compression apparatuses of the above embodiments purify and compress hydrogen from hydrogen-containing gas obtained by reforming town gas or the like, they may be used to compress pure hydrogen. Use of the hydrogen purification/compression apparatuses of the above embodiments in place of a compressor advantageously allows for the compression of hydrogen at low cost.

EXAMPLES

Described below is the result of an operation of a hydrogen purification/compression apparatus of the present invention including a monolayer single cell. Pure hydrogen was used in the present operation. Hydrogen was supplied from a hydrogen cylinder at a flow rate of 100 ml/min and a pressure of 0.1 MPa, humidified by a humidifier, and then introduced into the reformed gas supply passage 20*a* of the anode-side separator through the reformed gas supply passage 11*a*. The then cell conditions were 65° C. and 80% RH. Nafion 117 [thickness 180 µm; size φ20 (cathode)] was used as the polymer electrolyte membrane 40.

The hydrogen purification/compression apparatus received a supply of a predetermined constant current (1A, 2A, 3A) from a power supply and compressed hydrogen for one hour in constant current mode.

Figure 10:
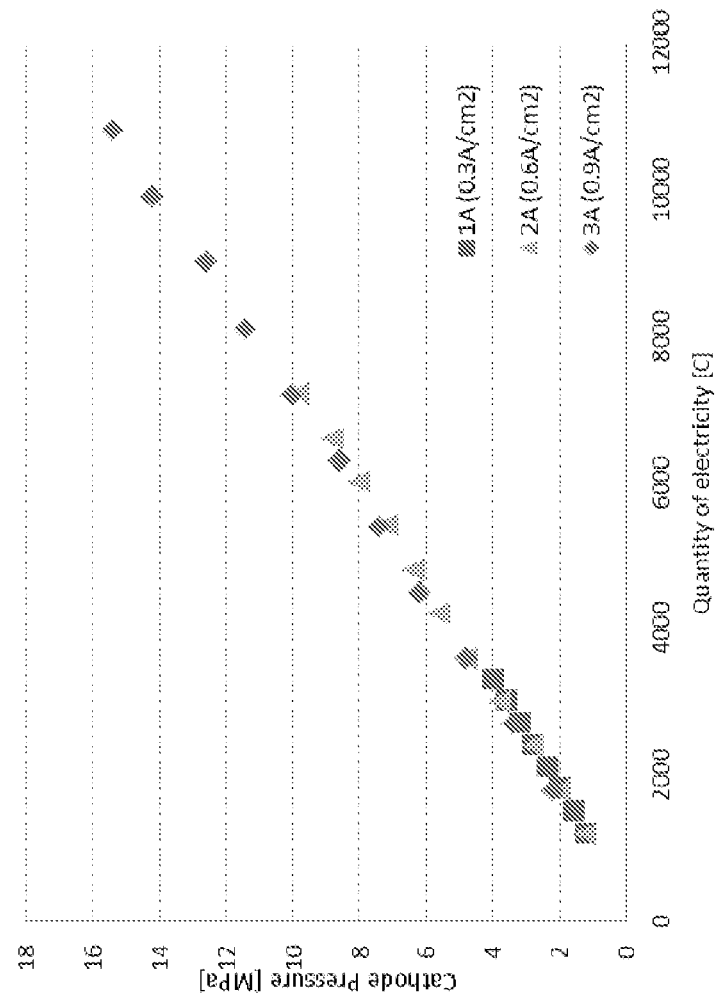
FIG. 10 is a graph showing the result of an operation of a hydrogen purification/compression apparatus of the present invention including a one-layer single cell.

The test results are shown in FIG. 10. The horizontal axis represents the quantity of electrolyte electricity (C), and the vertical axis represents the detected pressure. The graph indicates that the entire quantity of introduced electricity was converted into compression work until reaching about 20 MPa at the constant current (1A, 2A, 3A) and constant electrolyte current density (0.3 A/cm$^2$, 0.6 A/cm$^2$, 0.9 A/cm$^2$).

DESCRIPTION OF REFERENCE SIGNS

1: hydrogen production system
2*a*: reformer

2b: carbon monoxide preferential oxidation reactor 2b (PROX: preferential oxidation)
3: hydrogen purification/compression apparatus
3a: high-pressure tank
3b: inside of high-pressure tank
4: hydrogen tank
4a: water trap drain apparatus
5: major part of hydrogen purification/compression apparatus
6: base plate
7: clamp plate
8: cell structure
8a: separator
8b: bolt insertion hole
8c: reformed gas inlet
8d: reformed gas outlet
8e: wall
8f: groove (reformed gas passage)
8g, 8h, 11a, 20a: reformed gas supply passage
8k, 11b: reformed gas discharge passage
8i, 8j, 11c, 30a: hydrogen gas discharge passage
9: press jig
10: bolt
10a: nut
10b: press spring
12: gasket
13: positive electrode of external power supply
14: negative electrode of external power supply
15: external power supply
20: anode-side separator
20b: anode-side passage
21: anode-side sintered porous metal sheet (anode-side power feeder)
22: anode-side conductive water-repellent layer
23: anode catalyst layer (anode-side electrode)
30: cathode-side separator
30b: cathode-side passage
20d, 30d: annular protrusion
31: cathode-side sintered porous metal sheet (cathode-side power feeder)
32: cathode-side conductive water-repellent layer
33: cathode catalyst layer (cathode-side electrode)
34: elastic conductive member (collection member)
34a: wave shape
40: polymer electrolyte membrane

The invention claimed is:

1. A hydrogen purification/compression apparatus for producing, from hydrogen-containing gas, purified hydrogen gas having a higher pressure and a higher purity than a pressure and a purity of the hydrogen-containing gas, the apparatus comprising:
a plurality of stacked cell structures; and
a pressing structure configured to apply a clamping stress in a stacking direction of the cell structures,
wherein
each of the cell structures comprises:
a polymer electrolyte membrane;
an anode catalyst layer stacked on a first side of the polymer electrolyte membrane;
a cathode catalyst layer stacked on a second side of the polymer electrolyte membrane;
an anode-side power feeder disposed outside the anode catalyst layer so as to be opposite to the anode catalyst layer;
a cathode-side power feeder disposed outside the cathode catalyst layer so as to be opposite to the cathode catalyst layer;
an anode-side separator disposed outside the anode-side power feeder so as to be opposite to the anode-side power feeder and having a passage through which the hydrogen-containing gas is supplied; and
a cathode-side separator disposed outside the cathode-side power feeder so as to be opposite to the cathode-side power feeder and having a passage through which the purified hydrogen gas is discharged,
wherein a sealing portion between the cell structures comprises:
a gasket;
a pair of opposite flat portions formed on the anode-side separator and the cathode-side separator in order to press the gasket; and
an annular protrusion having one layer or a plurality of adjacent layers formed on both or either of the pair of the flat portions, and
the one annular protrusion or the adjacent annular protrusions compresses and presses the gasket between protrusions.

2. The hydrogen purification/compression apparatus of claim 1,
wherein the plurality of stacked cell structures are electrically connected in series or in parallel.

3. The hydrogen purification/compression apparatus of claim 1,
further comprising an elastic conductive member disposed between the cathode-side power feeder and the cathode-side separator and configured to apply a load in the stacking direction of the cell structures.

4. The hydrogen purification/compression apparatus of claim 1,
wherein a porous conductive water-repellent layer is disposed between one of the anode catalyst layer and the anode-side power feeder or between the cathode catalyst layer and the cathode-side power feeder.

5. The hydrogen purification/compression apparatus of claim 4,
wherein the conductive water-repellent layer is formed integrally with one of the anode-side power feeder or the cathode-side power feeder, the conductive water-repellent layer comprising a crushed and dried mixture of a carbon material, a surfactant, and a fluororesin polymer dispersion diluent bonded by hot press onto said anode-side power feeder or said cathode-side power feeder.

6. The hydrogen purification/compression apparatus of claim 1,
wherein
the pressing structure comprises a base plate, a clamp plate, and a pressing jig disposed between the clamp plate and the cell structures,
the base plate is disposed at one end of the stacked cell structures,
the clamp plate is disposed at the other end of the stacked cell structures and clamped by the base plate with the stacked cell structures therebetween using elasticity of a pressing spring,
the pressing jig is one of pyramidal or cone-shaped, and a bottom of the pressing jig adjacent to the cell structures is shaped such that the pressing jig can press an end surface of the cell structures approximately uniformly, and
at least one of the clamp plate and the pressing jig has a protrusion so that the clamp plate and the pressing jig contact each other at one point.

7. The hydrogen purification/compression apparatus of claim 1,
further comprising a high-pressure tank containing the cell structures and the pressing structure,
wherein
the high-pressure tank is filled with a gas medium, and
a pressure of the gas medium is kept higher than the pressure of the hydrogen-containing gas and lower than the pressure of the purified hydrogen gas.

8. A hydrogen production system comprising:
a hydrogen purification/compression apparatus of claim 1;
a hydrogen storage tank; and
a water trap drain apparatus,
wherein
the water trap drain apparatus is disposed on a hydrogen passage between the hydrogen purification/compression apparatus and the hydrogen storage tank and comprises a pair of water traps which can alternately switch between passages.

9. The hydrogen purification/compression apparatus of claim 1,
wherein a surface of the cathode-side power feeder has a size which falls within a surface of the anode-side power feeder in a surface direction parallel with the polymer electrolyte membrane.

* * * * *